Patented Nov. 21, 1933

1,936,190

UNITED STATES PATENT OFFICE 1,936,190

TREATMENT OF CELLULOSIC MATERIALS

Henry Dreyfus, London, England

No Drawing. Application February 10, 1931, Serial No. 514,902, and in Great Britain April 17, 1930

10 Claims. (Cl. 127—37)

This invention relates to improvements in the treatment of wood and other cellulosic materials for the purpose of obtaining glucose and other sugars therefrom.

In the manufacture of cellulose acetate from cellulosic materials the cellulose, with or without a pretreatment with organic acids, such as acetic acid or formic acid and/or with inorganic acids, e. g. hydrochloric acid, phosphoric acid or sulphuric acid, is acetylated with acetic anhydride usually in presence of acetic acid as solvent diluent and/or in the presence of a non-solvent diluent, such as benzene and the product approximating to the triacetate is subjected to a so-called ripening operation or secondary treatment for the purpose of eliminating sulphuric acid or other catalyst used in the esterification and/or for the purpose of conferring upon the product new solubility characteristics. The whole trend of research on the manufacture of cellulose acetate has been to reduce as much as possible or eliminate degradation of the cellulose molecule in the pretreatment itself, in the esterification proper and in the ripening. I have now found that this series of operations forms a valuable means of obtaining sugars from cellulosic materials provided that one or more steps of the operation are so conducted that degradation of the cellulose to the required extent is effected. Furthermore instead of acetic anhydride in the esterification step other anhydrides, such as butyric anhydride or propionic anhydride, may be employed.

Broadly therefore the present invention comprises a process for the saccharification of wood or other cellulosic materials by conducting an esterification of the wood by means of an acid anhydride with or without a pretreatment and a subsequent hydrolysis, so that degradation of the cellulose molecule is brought about. This degradation may take place during the esterification proper or during the ripening or partly during the pretreatment and partly during the esterification, or it may be effected in part in any two or more of the operations, including the pretreatment step where this is applied.

The steps of the operation may be carried out on lines very similar to those adopted in the manufacture of ripened cellulose esters with the proviso that no special steps need be taken at any stage of the operation to prevent degradation of the cellulose. Thus for example in the manufacture of cellulose acetate it is customary to apply a pretreatment with acetic acid, formic acid or other organic acid in the liquid or vapour state in presence or absence of mineral acids, for example sulphuric acid or hydrochloric acid, or substances having a mineral acid reaction, for instance bi-sulphates or ferric chloride, stannic chloride or the like (see my French specification No. 565,654 dated 30th April, 1923 and U. S. applications S. Nos. 348,981 filed 21st March, 1929 and 328,306 dated 24th December, 1928, and U. S. Patent No. 1,831,101 dated Nov. 10, 1931). If a pretreatment be applied in the process of the present invention the temperature may rise considerably so as to bring about or to initiate degration of the cellulose molecule. For example the cellulose may be preliminarily treated with a mixture of acetic acid and sulphuric acid, for instance with four times its weight of acetic acid containing 1–10% of sulphuric acid, and especially about 3–5%, at a temperature of 50–100° C., and particularly about 60–90° C. Alternatively the cellulosic material may be pretreated with sulphuric acid or hydrochloric acid alone or with other substances having a mineral acid reaction.

Again in the esterification proper in presence of sulphuric acid in order to avoid degradation of the cellulose molecule the temperature of esterification is usually maintained at about ordinary atmospheric temperature or less up to about 35° C., and in any case must not be allowed to exceed about 55° C. even in the case of obtaining products of low viscosity (see United States patent application S. No. 231,397 filed 5th November, 1927). In effecting the esterification according to the present invention on the other hand comparatively high temperatures may be employed, and it is particularly advantageous to work at temperatures of 60–90° C. in the case of using sulphuric acid as catalyst, while still higher temperatures may be employed with zinc chloride, ferric chloride or bi-sulphates as catalysts. The esterification may be effected with liquid anhydride with or without a solvent diluent, such as acetic acid, and with or without a non-solvent diluent, for example benzene. Alternatively the esterification may be effected with vapours of anhydride whether or not a pretreatment is applied, (see United States Patent No. 1,831,102 dated Nov. 10, 1931). In such a case the cellulosic material may be preliminarily impregnated with a catalyst, for example sulphuric acid, or as an alternative a gaseous catalyst, for example gaseous hydrochloric acid, may be passed over or through the cellulosic material together with the anhydride.

Lastly in the so-called ripening treatment in the ordinary manufacture of cellulose esters if the catalyst, for instance sulphuric acid, be still present the temperature of the ripening is kept down for example below 30° C., or alternatively if the ripening be effected at higher temperatures free mineral acidity is removed. In the present process such considerations of avoiding degradation do not of course apply, and the ripening may be effected at comparatively high temperatures in presence of mineral acid or other strong catalyst used for the esterification, and furthermore for the ripening or hydrolysis step additional mineral acid or other substance having mineral acidity may be used in order to accelerate the decomposition of the acetate or other ester and/or of the cellulose molecule. The temperature of such treatment may in fact be carried to above 100° C. for example to 130°-140° C.

The hydrolytic treatment may further be effected by means of steam applied either to the liquid reaction product produced in solution or to the reaction product produced in suspension after separation from the suspending medium or again to the reaction product produced by esterification with vapours. In the first case the hydrolytic treatment may be carried out by injecting steam into the liquor and simultaneously the acetic acid or other organic acid may be removed. In the other two cases the solid reaction product may be treated directly with steam with or without addition of further mineral acid.

The acetic acid or other organic acid present during the esterification and/or hydrolysis as diluent or eliminated during the hydrolysis may be removed from the reaction product by any suitable process. For example it may be removed by distillation in steam, and the resulting aqueous acid concentrated for further use in the process by any suitable concentration operation, such as extraction, distillation in presence of azeotropic liquids etc. Again the acetic acid or other acid in the saccharified liquor may be separated directly by an extraction process with benzene, toluene, a mixture of petroleum ether and ether, chlor-hydrocarbons, for instance dichlorethylene, trichlorethylene, methylene dichloride, ethylene dichloride, chloroform or other suitable solvents. In such an extraction process the last traces of acetic acid or other organic acid may be removed from the reaction liquor by steam distillation. Preferably before removing the acetic acid the mineral acid or other catalyst used for the esterification and/or hydrolysis is removed or neutralized for example with lime or sodium acetate in the case of sulphuric acid or other mineral acid.

A convenient process in the case of eliminating the acetic acid or other organic acid by means of an extraction process with an organic solvent is to carry out the whole esterification and hydrolysis in presence of the organic solvent. For instance the cellulose, pretreated or not, may be acetylated in presence of benzene or other solvent for acetic acid so that the cellulose acetate or degraded cellulose acetate is produced in suspension as opposed to solution. The hydrolysis of the cellulose acetate or degraded cellulose may then be effected by addition of water or other hydroxy compound such as alcohol, glycerin etc., known in the art of ripening cellulose esters, with or without further mineral acid or other catalyst, and the benzene or other solution of acetic acid drawn off directly from the saccharified liquor. Alternatively the separation of the benzene solution of acetic acid may be effected before hydrolysis of the cellulose or degraded cellulose acetate, and the ripening then effected for instance in aqueous suspension or solution, if the product be sufficiently broken down.

The process of the present invention is however most valuable, and the highest yields appear to be obtainable when the esterification of the cellulose or its conversion products be carried out so that the cellulose or degraded cellulose ester is produced in solution. Such a process appears to permit of much more rigid control of the breaking down of the cellulose molecule either in the esterification operation or in the hydrolytic treatment.

As starting materials for the present invention, wood, for example in the form of saw-dust, or wood from which non-cellulosic impurities have been substantially removed, as for example in sulphite pulp, soda pulp or sulphate pulp, may be used or any other cellulosic materials. The use of raw wood however is to be preferred. If desired the wood or other cellulosic material may be treated to remove resins, pentosans, lignin and the like, and reference is made to the alkali treatment step of U. S. Patent No. 1,711,110. Here again if such a pretreatment be applied no special steps need be taken to avoid degradation of the cellulose. In the present case however lignin need not be removed since it is itself capable of producing sugars. On the other hand it is preferable to remove or decompose the pentosan content of the wood. This may be effected in any suitable manner, for example by treating with dilute alkali as previously referred to, or the pentosan may be hydrolyzed to pentoses by a treatment with mineral acid, for example 4-8% aqueous sulphuric acid or sodium or potassium bi-sulphate or other acid reagent. The soluble pentoses may then be removed from the main bulk of the material before proceeding with the esterification and/or other preliminary treatment.

A pretreatment with organic acids and/or mineral acids as referred to above may be effected so as to hydrolyze the cellulosic material to the stage of hydro-cellulose according to the processes investigated by Girard in his article on Hydrocellulose and its derivatives in the Annales de Chimie et de Physique—series 5—volume 24, or the breaking down of the cellulose may be carried even further in the preliminary treatment.

As already indicated the esterification may be effected at high temperatures or comparatively high temperatures, and I have found that for the purpose of the present invention it is preferable so to conduct the esterification and/or pretreatment that after esterification the solution of cellulose acetate or other cellulose ester or ester of a conversion product of cellulose in acetic acid or other solvent is not precipitated on addition of large quantities of water. By effecting the esterification and/or preliminary treatment in this manner a substantial breaking down of the cellulose molecule has already been effected and less breaking down or degradation is required in the subsequent step of hydrolysis.

While the invention has been described above more particularly in relation to the saccharification of wood or other cellulose materials in a process involving esterification with acetic anhydride it also includes processes involving esterification with any other organic anhydrides, and contemplates broadly conducting an esterification with an acid anhydride of wood or other cellulosic materials with or without pretreatments and then hydrolyzing the product, one or more steps of the operation being so conducted that the cellulose molecule breaks down to the required extent.

The following examples illustrate the invention but are not to be regarded as limiting it in any way.

Example 1

Saw-dust is preliminarily treated as described in U. S. Patent No. 1,711,110 by boiling with dilute alkali, the product being then washed and hydro-extracted. 100 parts of the material thus obtained are then treated with 400 parts of acetic acid and 10 parts of sulphuric acid, 98% strength, for 2 hours at 50° C. There are then added 250 parts of acetic anhydride, and the whole is maintained at a temperature of 60-70° C. for 2 hours, after which the temperature is maintained at 50-60° C. for a further 16 hours. Live steam is introduced into the liquor so as to maintain the same at a temperature of 100-120° C., the steam being suitably superheated. The passage of the steam is continued until the product is completely water soluble, after which the sulphuric acid is neutralized by suitable addition of lime. Any remaining acetic acid combined with the product may be eliminated by further passage of steam.

Example 2

100 parts of alkali purified saw-dust are treated for 2 hours at 50° C., as in Example 1, with 400 parts of acetic acid and 2 parts of sulphuric acid together with 8 parts of phosphoric acid. The acetylation and the hydrolysis of the product may then be conducted as described in Example 1.

If desired in the above examples, the lime or other neutralizing agent may be added before the treatment with steam or before the completion of the same.

What I claim and desire to secure by Letters Patent is:—

1. A process for the saccharification of wood or other cellulosic materials, comprising treating the cellulosic material with an organic acid anhydride and hydrolyzing the product, one or more stages of the treatment being so conducted as to degrade the cellulosic material to sugars.

2. A process according to claim 1, wherein the cellulosic material is treated with acetic anhydride.

3. Process for the saccharification of wood or other cellulosic materials, comprising treating the cellulosic material with an organic acid anhydride in presence of a mineral acid reagent and hydrolizing the product, the treatment being so conducted as to degrade the cellulosic material to sugars.

4. Process for the saccharification of wood or other cellulosic materials, comprising treating the cellulosic material with acetic anhydride in presence of a mineral acid reagent and hydrolyzing the product, the treatment being so conducted as to degrade the cellulosic material to sugars.

5. Process for the saccharification of wood or other cellulosic materials, comprising subjecting the said materials to a pretreatment with acids, then with an organic acid anhydride in the presence of a mineral acid reagent, and hydrolyzing the product, the treatment being so conducted as to degrade the cellulosic material to sugars.

6. Process for the saccharification of wood or other cellulosic materials, comprising subjecting the said materials to a pretreatment with acids, then with acetic anhydride in the presence of a mineral acid reagent, and hydrolyzing the product, the treatment being so conducted as to degrade the cellulosic material to sugars.

7. Process for the saccharification of wood or other cellulosic materials, comprising subjecting the cellulosic material to a pretreatment with acids so as to degrade the cellulosic material, then subjecting said material to a treatment with an organic acid anhydride in presence of a mineral acid reagent, and hydrolyzing the product, the whole treatment being so conducted as to degrade the cellulosic material to sugars.

8. Process for the saccharification of wood or other cellulosic materials, comprising subjecting the cellulosic material to a pretreatment with acids so as to degrade the cellulosic material, then subjecting said material to a treatment with acetic anhydride in presence of a mineral acid reagent, and hydrolyzing the product, the whole treatment being so conducted as to degrade the cellulosic material to sugars.

9. Process for the saccharification of wood or other cellulosic materials, comprising treating the cellulosic material with an organic acid anhydride in the presence of a catalyst and hydrolyzing the product, the treatment being so conducted as to degrade the cellulosic material to sugars.

10. Process for the saccharification of wood or other cellulosic materials, comprising treating the cellulosic material with acetic anhydride in the presence of a catalyst and hydrolyzing the product, the treatment being so conducted as to degrade the cellulosic material to sugars.

HENRY DREYFUS.